Patented Nov. 29, 1949

2,489,336

UNITED STATES PATENT OFFICE 2,489,336

CONDENSATION PRODUCTS OF MONONUCLEAR MONOHYDRIC PHENOLS, FORMALDEHYDE, AND MONONUCLEAR DIHYDRIC PHENOLS

Raymond J. Spahr, Bainbridge, N. Y., William R. Moffitt, Seattle, Wash., and Everett H. Pryde, Beaver Falls, Pa., assignors to The Borden Company, New York, N. Y., a corporation of New Jersey No Drawing. Application February 16, 1945, Serial No. 578,358

6 Claims. (Cl. 260—54)

This is a continuation-in-part of the copending application Serial No. 455,608, filed August 21, 1942, now abandoned.

This invention relates to condensation products of mononuclear monohydric and unsubstituted mononuclear dihydric phenols together with a methylene condensing agent, and to the process of making such products. More particularly, the invention is concerned with the preparation of phenol-resorcinol-formaldehyde condensation products which are suitable for use as glues, are miscible with water in all proportions, and which can readily be converted into insoluble, infusible masses by the application of heat or the use of a catalyst.

In recent years, the use of synthetic resin glues in the manufacture of plywood has increased tremendously. The urea-formaldehyde resins have been used principally in making plywood for indoor construction units since these glues do not provide bonds meeting the various requirements for use where the plywood is exposed to weathering conditions. The phenol-formaldehyde resins have also been used and have the valuable property of producing extremely weather resistant bonds between the wood veneers.

Various tests have been devised for determining the weather resistance of plywood bonded by different glues. One of such tests is known as the 3½ cycle test of the United States Forest Products Laboratory. This consists of preparing one inch square plywood specimens made up of three plies of 1/16 inch thick single ply birch veneers. These specimens are alternately soaked in water for 16 hours at 70° F., and dried at 140 to 150° F. for 8 hours until three and one-half cycles have been completed. The specimens are then sheared while wet and must show an average of at least 50% wood failure.

An even more drastic test is that of the Douglas Fir Plywood Association, which consists of the preparation of one inch square plywood specimens consisting of three plies of 1/16 inch thick single ply fir veneers. These specimens are boiled in water for four hours, dried at 140 to 150° F. for twenty hours, boiled in water again for four hours and sheared while wet. After this treatment, the specimen must show an average of at least 60% wood failure, a minimum of 30% wood failure and no delamination in the test strips.

Specimens glued with urea-formaldehyde resin glues do not meet these specifications, nor do they pass the army and navy specifications for aircraft flat panel plywood which involves boiling of the panels in water, because these resins allow the plies to separate during the boiling.

The phenol-formaldehyde resins do pass the tests outlined above, but there are various other objections to them. These phenolic resin glues require a high temperature and pressure of the order of 300 to 325° F. and 150 to 250 lbs. per square inch to set them when a strong acidic hardening agent is not employed. This high temperature has a deleterious effect on the wood, tending to weaken the outer surface of the wood panel and to dry it out excessively so that the panels have to be subjected to a special dehumidifying treatment to restore their normal moisture content. Also, such a high pressing temperature promotes the formation of steam pockets and frequently results in weak and blistered panels.

The use of strong acidic hardening agents is employed in connection with phenolic resins to lower their setting temperature but such acidic materials adversely affect the wood fibres. Also, these phenolic resin glues, when employed in solution or dispersion form, do not remain in a spreadable condition very long and are difficult to handle for this reason.

Phenolic adhesives have been used with a lower pressing temperature of the order of 240 to 250° F. by introducing into the phenolic adhesive a substance such as spray dried blood albumin. However, the use of protein materials is not particularly desirable for plywood exposed to the weather because it then has a tendency to develop mold growth under high humidity and temperature conditions. Also, this use of blood albumin does not solve the problem of handling the phenolic glue and they still have to be used rapidly in order to set them before it gels. In other words, a panel that is prepared using such a resin glue has to be pressed within about fifteen or twenty minutes after the glue is spread on the veneers.

It is thus apparent that there has been for some time a strong need in the art for a glue that is easy to handle commercially, that sets or can be cured at a relatively low pressing temperature, and that avoids the other objections outlined above in the production of boil-proof plywood.

Recently large sections of plywood planes and other units have been manufactured by spreading veneers with a suitable resin glue, tacking or stapling them together and assembling the veneers on a wooden mold. This assembly is then inserted in a wide-mouth rubber bag which is closed and placed in a pressure tank. The air within the bag is removed by a vacuum pump and steam and air under pressure are then forced into the pressure tank to perform the curing operation. This method is characterized by a long assembly time, and the glues that are satisfactory for use in this process have to remain in a workable condition for many hours after being spread on the wood veneers. Also, high pressing temperatures of the order of 300° F. or higher have to be avoided because of the adverse effect of such temperatures on the rubber bag.

One object of this invention is the provision of a phenolic resin glue which overcomes the foregoing disadvantages and which is admirably suited for the preparation of large assemblies by the rubber bag pressure tank method.

A further object of this invention is the provision of phenol-resorcinol-formaldehyde glues which are characterized by a relatively low pressing temperature, which remain in a heat convertible condition for a period of many hours after being spread on wood veneers, and which yield boil-proof glue bonds meeting the most rigid specifications.

A further object of this invention is the provision of glues having the foregoing properties which do not require acidic catalysts and which do not contain proteinaceous materials.

Another object of this invention is the provision of a method of preparing such a glue by a controlled reaction between a mononuclear monohydric phenol, an unsubstituted mononuclear dihydric phenol and a methylene condensing agent.

According to this invention, a mononuclear monohydric phenol such as phenol, a cresol or a xylenol is condensed with formaldehyde in an aqueous alkaline solution until a low condensed polymer is formed. For example, an o-cresol may be condensed with formaldehyde in an aqueous alkaline solution; or again, a p-xylenol or a mixture of m-xylenol and m-cresol may be condensed in an aqueous alkaline solution. An unsubstituted mononuclear dihydric phenol (i. e. resorcinol, pyrocatechol, or hydroquinone) is then added, together with sufficient additional non-volatile alkali to maintain the solution at a pH between 9.0 and 13.0. This solution is then heated to a temperature of the order of 75 to 80° C. and condensed to produce a composition of a viscosity between 30 and 200 as determined on a Stormer viscometer at 70° F. using a 500 gram weight. These viscosity values and all of Stormer viscosity values to which reference is hereinafter made are determined by the number of rotations which the spindle makes in a period of one minute.

The partially condensed resin solution of the monohydric phenol and the methylene condensing agent should be cooled before the unsubstituted dihydric phenol is added because if this solution is not at a temperature of 75° C. or lower, the unsubstituted dihydric phenol causes the mix to gel in the space of a few minutes after it is added. Ordinarily, it is preferable to cool the material to 40° C. or lower and desirably not below 25° C., before adding the unsubstituted dihydric phenol.

The proportion of the unsubstituted mononuclear dihydric phenol employed is between 1.1 and 10.0 parts by weight of the unsubstituted mononuclear dihydric phenol per 10 parts by weight of the mononuclear monohydric phenol, while the amount of the methylene condensing agent, such as formaldehyde, used is between 1.0 and 2.5 mols per mol of mononuclear monohydric phenol. If desired, the unsubstituted dihydric phenol, such as resorcinol, may be mixed with the monohydric phenol and methylene condensing agent at the beginning of the condensation reaction. However, the proportion of resorcinol that can be added at this stage, even with a fairly alkaline mixture, is limited to a maximum of approximately four parts by weight of resorcinol per ten parts by weight of monohydric phenol when approximately 2.3 mols of formaldehyde per mol of monohydric phenol is employed. When smaller quantities of formaldehyde are used in preparing the initial condensation product, slightly larger proportions of resorcinol may be used. Also, if larger quantities of resorcinol are desired in the final product, an additional amount of resorcinol may be added together with additional non-volatile alkali after the mixture has been partially condensed and cooled, as described above.

The proportion of unsubstituted dihydric phenol such as resorcinol employed has a marked effect upon the storage life of the solution and also upon the curing temperature of the final product. In general, the storage life of the solution is lengthened and the curing temperature of the product is lowered as the proportion of resorcinol is decreased within the limits of 1.1 to 10 parts of the unsubstituted dihydric phenol per 10 parts by weight of the monohydric phenol. For most purposes, it is desirable to employ at least about 2.5 parts of resorcinol for each 10 parts of monohydric phenol, such as phenol, in order to produce a product with a sufficiently low curing temperature of the order of 200–230 F. or lower. In general, it is preferred to use a fairly high proportion of formaldehyde or equivalent methylene condensing agent. The useful life of the resin solution is decreased as the mol ratio of formaldehyde is increased.

Alternately, certain condensation products of a mononuclear monohydric phenol such as phenol and a methylene condensing agent which have a relatively high curing temperature in a range of 310 to 325° F. may be utilized to produce the condensation products of this invention. By adding an unsubstituted mononuclear dihydric phenol to these condensation products a composition is obtained which has a relatively low curing temperature. The condensation products which may be treated in this manner are water soluble and have a pH value between 10.5 and 13. The proportion of formaldehyde employed to produce these condensation products is between 1.0 and 2.5 mols of formaldehyde per mol of monohydric phenol. Certain precautions, however, must be taken in following this procedure. The addition of the unsubstituted mononuclear dihydric phenol such as resorcinol to the condensation product reduces the viscosity of the condensation product so that it is desirable to add a suitable filler along with the dihydric phenol. Fillers such as ground walnut shell flour, wood flour and various finely ground seed meals that thicken the solution are satisfactory for this purpose. The proportion of the dihydric phenol such as resorcinol employed has a marked effect upon the curing temperature and the storage life of the final product. The proportions employed on a dry basis, in accordance with this invention, are between 2.5 parts by weight and 15 parts by weight of the unsubstituted dihydric phenol for each 10 parts by weight of the condensation product of the mononuclear monohydric phenol and the methylene condensing agent.

The product resulting from the practice of this alternate procedure has a markedly reduced curing temperature from that of the condensation product of the monohydric phenol and the methylene condensing agent. The minimum curing temperature obtainable with a condensation product of a mononuclear monohydric phenol and a methylene condensing agent to which an unsubstituted mononuclear dihydric phenol has been added just prior to spreading the glue on veneers is about 260° F., whereas by the method first described of initially condensing the monohydric phenol and the methylene condensing agent, and subsequently adding the dihydric phenol and completing the condensation reaction curing temperatures as low as between 200–220° F. may be obtained.

When the glue is being prepared for spreading, an amount of paraformaldehyde, hexamethylenetetramine or a similar material furnishing formaldehyde should be added to bring the total quantity of formaldehyde in the product up to between 1.5 and 2.5 mols of formaldehyde for each mol of total phenols employed. Preferably the total quantity of formaldehyde should be approximately 2.0 mols for each mol of total phenols employed. It is apparent, therefore, that the exact amount of paraformaldehyde or the like added at this stage depends entirely upon the proportion of formaldehyde that is used initially in preparing the resin solution. Slightly smaller or larger quantities of paraformaldehyde or the like may be added at this stage depending upon the time that the glue has to remain in a heat convertible condition after it is spread, the temperature at which the glue is to be cured, the time of curing desired, etc. It is possible, according to this invention, to prepare phenolic resin glues capable of providing boil-proof glue lines meeting the most rigid specifications and, at the same time, provide a glue that can be cured at a temperature of 220° F. or lower within the space of a few minutes.

The addition of the material furnishing the formaldehyde is required since if too much formaldehyde is employed in producing the initial condensation product, the resin gels immediately upon the addition of the unsubstituted mononuclear dihydric phenol such as resorcinol. The useful life of the resin solution is decreased as the mol ratio of formaldehyde in the initial condensation product is increased. It is usually desirable to employ as high a proportion of formaldehyde as is practical in making the initial product so that less hardening agent is required to be added just before the resin is cured. Any suitable smaller proportion of formaldehyde may be used initially if the addition of larger quantities of the material furnishing the formaldehyde is not objectionable just prior to the curing of the resin. The smaller amount of formaldehyde employed in preparing the initial resin, however, the larger is the proportion of unreacted phenols in the glue, and consequently the more violent is the exothermic reaction that takes place when the material furnishing the formaldehyde is added just prior to curing.

In preparing resin solutions according to this invention, it is important to produce a product that is completely miscible with water so that its viscosity can be easily adjusted, it can be readily handled, washed from spreader rolls, etc. In order to produce a suitable resin solution that remains completely water soluble, it has been found necessary to prepare the resins using sufficient non-volatile alkaline materials to obtain a pH between 9.0 and 13.0 and to maintain such an alkaline pH after the dihydric phenol is added. Strong non-volatile alkalies, such as caustic soda, caustic potash, and lime, are preferred for this purpose. The alkali may all be added at the beginning of the reaction, or sufficient alkali may be added to the initial reactants to bring about the preliminary condensation, and the balance of the alkali may be added when additional dihydric phenol is added to make sure that this dihydric phenol goes into solution and does not gel the resin.

The following examples are given of the preparation of low temperature curing phenolic resins in accordance with this invention, but they are simply illustrative and there is no intention of limiting the invention to the details given therein.

Example I

One hundred pounds of phenol, 200 pounds of 37% formaldehyde, 14 pounds of caustic soda flakes, and 25 pounds of water are charged into a jacketed kettle equipped with a stirring device and a reflux condenser. An exothermic reaction takes place and the temperature of the mix rises rapidly. At 80–85° C. cooling is applied so that the rise in temperature is controlled and the batch comes gradually up to reflux. Refluxing is continued until the viscosity of the solution reaches "C" to "D" on the Gardner bubble viscometer. The batch is then cooled to 85° C. and the solution is maintained at this temperature until the viscosity reaches "H" at which point it is cooled to 80° C. When the viscosity reaches "J" the batch is cooled to 40° C. and 50 pounds of resorcinol, 11 pounds of caustic soda flakes and 60 pounds of water are added. The solution is reheated to 80° C., the batch is condensed to a viscosity of "N" and is then cooled to 75° C. When the viscosity reaches "Q," the batch is cooled to room temperature.

The finished resin solution has a viscosity of 120–130 at 70° F. as determined on a Stormer viscometer using a 500 gram weight, a pH between 9.7 and 10.0, and a solids content of approximately 48%.

To demonstrate the critical nature of the proportions of ingredients employed to produce the condensation product of this invention, the adhesive prepared in accordance with this example was compared with another condensation product made by a prior art method in which the proportion of the ingredients were without the range of those in accordance with this invention. This latter condensation product was produced by condensing phenol, resorcinol and formaldehyde under alkaline conditions at a pH above 10.0. The amount of resorcinol was .25 part of resorcinol per 10 parts of phenol and the amount of formaldehyde was 1.25 mols of formaldehyde per mol of phenol. Gluing tests were made with each of these compositions on fir using a construction consisting of 3 plies of 1/10" veneer. In each test the panels were pressed for 4 minutes at 220° F. The panels glued with the resin prepared in accordance with this example gave a dry shear of 315-90, a wet shear of 315-90, a D. F. P. A. Alt. Ext. B. S. of 280-100 with a minimum fibre of 95%. The panels glued with the resin prepared in accordance with the prior art method fell apart while being sawed prior to testing.

*Example II*

Five hundred pounds of phenol, 1000 pounds of 37% formaldehyde, 70 pounds of caustic soda flakes, and 125 pounds of water are charged into a jacketed kettle equipped with a stirring device and a reflux condenser. An exothermic reaction takes place, and sufficient cold water is circulated through the kettle jacket to prevent the solution from foaming over on reaching the refluxing temperature. Refluxing is continued until the viscosity reaches "C" on the Gardner scale, and the batch is then cooled to 85° C. and held there until the viscosity reaches "H." The batch is then cooled to 40° C. and 450 pounds of resorcinol, 90 pounds of caustic soda flakes, and 110 pounds of water are added to the kettle. The solution is reheated to 80° C. and held there until the viscosity reaches "S," and is then cooled to room temperature.

The finished resin solution has a viscosity of 80-90 at 70° F. as determined on a Stormer viscometer using a 500 gram weight, its pH is between 9.6 and 9.9, and its solids content is approximately 57%.

*Example III*

Four hundred pounds of phenol, 924 pounds of formaldehyde and 240 pounds of 30% caustic soda solution are charged into a jacketed kettle. To the mix is added 160 pounds resorcinol. Cooling is applied to the material as soon as the resorcinol is added so that the exothermic reaction which takes place can be readily controlled. The batch is heated slowly to a temperature of 80° C. and held there until the viscosity reaches "E" on the Gardner scale. The temperature is then lowered to 70° C. and the batch held at this temperature until the viscosity reaches "N" at which point it is cooled to 65° C. and held at this temperature until the resin has a viscosity of approximately "Q." The batch is then cooled to room temperature.

The finished resin solution has a viscosity of 120-130 as determined on the Stormer viscometer using a 500 gram weight, a pH between 9.7 and 10.0, and a solids content of approximately 50%.

*Example IV*

One hundred lbs. of phenol, 195 pounds of 37% formaldehyde, 16 pounds caustic soda flakes, and 50 pounds of water are charged into a jacketed kettle. An exothermic reaction takes place which carries the temperature of the solution to 100° C. The batch is cooled to 85° C. and the condensation continued at this temperature until the viscosity reaches "C" on the Gardner viscometer at which point the temperature is lowered to 75° C. When the viscosity of the solution reaches "G" the temperature is lowered to 65° C. and when the viscosity reaches "I" the batch is cooled to room temperature.

Resorcinol may now be added to the solution, or the solution may be spray dried by subjecting it to a high temperature for a short period of time. The powder formed in the drier is immediately removed from the hot dry zone and cooled to room temperature to prevent undue condensation of the resin.

Since the shelf life of the resin powder is considerably longer than that of the resin liquid, it is common practice to employ phenolic resin powders in plywood applications. A typical glue formula embodying this invention is as follows:

| | Parts |
|---|---|
| Resin powder | 100 |
| Resorcinol | 40 |
| Paraformaldehyde | 5 |
| Walnut shell flour | 75 |

The above materials are dissolved in 175 parts of water and the solution stirred until a homogeneous mix is obtained. A satisfactory mix is obtained after agitating for approximately 15 minutes.

The resin powder may be mixed with resorcinol and in inert filler and finally a catalyst which may be either paraformaldehyde or hexamethylenetetramine is added. Alternately, the powder may be reconstituted with water before addition of the resorcinol and methylene curing agent.

The resin prepared in accordance with Example IV has a relatively high percentage of alkali. This is necessary to keep the resin in solution when the resorcinol is added. The high alkalinity of the resin solution causes an exothermic reaction to take place when the resin powder is dissolved in water, and the resorcinol, when dissolved in the resin solution, thins out the solution so that it is desirable to add a small percentage of an extender such as walnut shell flour or other suitable material to thicken the mix to a spreadable viscosity.

The resins prepared according to this invention may be mixed with various extenders, such as wood flour, walnut shell flour, etc., as will be understood by those skilled in the art. These glues may also be spray dried, and the dried powder can thereafter be reconstituted with water to provide a glue of good spreadable consistency.

When the resins prepared in accordance with Examples I to IV are ready for application as an adhesive, an amount of paraformaldehyde, hexamethylenetetramine or a similar material furnishing formaldehyde is added to bring the total quantity of formaldehyde in the product up to 1.5 to 2.5 mols of formaldehyde for each mol of total phenols employed. Preferably the total formaldehyde is about 2 mols of formaldehyde for each mol of total phenol employed.

A particular advantage of these glues is that their composition may be easily adjusted so that they remain in a heat convertible condition for several days after being spread and thus are very easy to handle when used in making up complicated assemblies of the type cured by the pressure tank method. While curing temperatures of 220° F. for the resins of type in Examples I, II and III and curing temperatures of about 260° F. for resins of the type described in Example IV have been mentioned, it will be apparent that the glues may be so adjusted as to cure at a slightly higher temperature, or, on the other hand, they may be cured at a temperature as low as 140° F., although substances such as paraformaldehyde that supply the additional formaldehyde must be used when the glue is cured at the lower temperatures. Hexamethylenetetramine is satisfactory as a curing aid only at higher temperatures that split it into its components of formaldehyde and ammonia.

These glues also have excellent stability when stored in liquid or dry form at normal room temperatures, and, in fact, can be kept for relatively long periods of time when stored at temperatures somewhat above room temperature. It is desirable, of course, to delay the addition of the curing agent until the glue is being prepared for spreading, since the addition of a substance like paraformaldehyde may interfere with the satisfactory storage of the glue.

These glues have been described as particularly useful in the manufacture of plywood, although it is to be understood that they are excellent bonding agents for other materials, such as paper, rockwool, cork, sand, and the like. In fact, they are excellent bonding agents for such materials as "compregnated" wood, which is a hard, dense board prepared by impregnating wood veneers with a low condensed phenolic resin, and drying and pressing the impregnated veneers under extremely high pressures and very high temperatures. Such a material is a poor conductor of heat, and consequently, it is difficult to bond thick sections of such a material with a glue that has too high a curing temperature.

The terms and expressions which we have employed are used as terms of description and not of limitation, and we have no intention in the use of such terms and expressions, of excluding any equivalents of the features shown and described or portions thereof, but recognize that various modifications are possible within the scope of the invention claimed.

What is claimed is:

1. A water soluble phenolic resin glue composition produced by reacting one mol of a mononuclear monohydric phenol selected from the class consisting of phenol, cresols, xylenols, and mixtures thereof with 1.0 to 2.5 mols of formaldehyde in an aqueous alkaline solution until a low condensed polymer is formed, adding, while maintaining the resulting condensation product at a temperature of 25 to 75° C., a mononuclear dihydric phenol selected from the class consisting of resorcinol, pyrocatechol and hydroquinone together with sufficient non-volatile alkali to maintain the mixture at a pH between 9.0 and 13.0, the amount of said mononuclear dihydric phenol added being 1.1 to 10 parts by weight per 10 parts by weight of said mononuclear monohydric phenol, and condensing the reaction mixture by heating until the resulting product has a viscosity between 30 and 200 revolutions per minute as determined on a Stormer viscometer at 70° F. using a 500 gram weight.

2. A water soluble phenolic resin glue composition produced by reacting one mol of phenol with 1.0 to 2.5 mols of formaldehyde in an aqueous alkaline solution until a low condensed polymer is formed, adding, while maintaining the resulting condensation product at a temperature of 25 to 70° C., resorcinol together with sufficient non-volatile alkali to maintain the mixture at a pH between 9.0 and 13, the amount of resorcinol added being 1.1 to 10 parts by weight per 10 parts by weight of said phenol, and condensing the reaction mixture by heating until the resulting product has a viscosity between 30 and 200 revolutions per minute as determined on a Stormer viscometer at 70° F. using a 500 gram weight.

3. A water soluble phenolic resin glue composition produced by reacting one mol of phenol with 1.0 to 2.5 mols of formaldehyde in an aqueous alkaline solution until a low condensed polymer is formed, adding, while maintaining the resulting condensation product at a temperature of 25 to 75° C., resorcinol together with sufficient non-volatile alkali to maintain the mixture at a pH between 9.0 and 13, the amount or resorcinol added being 2.5 to 4 parts by weight per 10 parts of said phenol, and condensing the reaction mixture by heating until the resulting product has a viscosity between 30 and 200 revolutions per minute as determined on a Stormer viscometer at 70° F. using a 500 gram weight.

4. The process of producing a water soluble phenolic resin glue composition which comprises reacting one mol of a mononuclear monohydric phenol selected from the class consisting of phenol, cresols, xylenols and mixtues thereof with 1.0 to 2.5 mols of formaldehyde in an aqueous alkaline solution until a low condensed polymer is formed, adding, while maintaining the resulting condensation product at a temperature of 25 to 75° C., a mononuclear dihydric phenol selected from the class consisting of resorcinol, pyrocatechol and hydroquinone together with sufficient non-volatile alkali to maintain the mixture at a pH between 9.0 and 13.0, the amount of said mononuclear dihydric phenol added being 1.1 to 10 parts by weight per 10 parts by weight of said mononuclear monohydric phenol and condensing the reaction mixture by heating until the resulting product has a viscosity between 30 and 200 revolutions per minute as determined on a Stormer viscometer at 70° F. using a 500 gram weight.

5. The process of producing a water soluble phenolic resin glue composition which comprises reacting one mol of phenol with 1.0 to 2.5 mols of formaldehyde in an aqueous alkaline solution until a low condensed polymer is formed, adding, while maintaining the resulting condensation product at a temperature of 25 to 70° C., resorcinol together with sufficient non-volatile alkali to maintain the mixture at a pH between 9.0 and 13, the amount of resorcinol added being 1.1 to 10 parts by weight per 10 parts by weight of said phenol, and condensing the reaction mixture by heating until the resulting product has a viscosity between 30 and 200 revolutions per minute as determined on a Stormer viscometer at 70° F. using a 500 gram weight.

6. The process of producing a water soluble phenolic resin glue composition which comprises reacting one mol of phenol with 1.0 to 2.5 mols of formaldehyde in an aqueous alkaline solution until a low condensed polymer is formed, adding, while maintaining the resulting condensation product at a temperature of 25 to 75° C., resorcinol together with sufficient non-volatile alkali to maintain the mixture at a pH between 9.0 and 13, the amount of resorcinol added being 2.5 to 4 parts by weight per 10 parts of said phenol, and condensing the reaction mixture by heating until the resulting product has a viscosity between 30 and 200 revolutions per minute as determined on a Stormer viscometer at 70° F. using a 500 gram weight.

RAYMOND J. SPAHR.
WILLIAM R. MOFFITT.
EVERETT H. PRYDE.

(References on following page)

REFERENCES CITED

The following references are of record in the file of this patent:

UNITED STATES PATENTS

| Number | Name | Date |
|---|---|---|
| 1,802,390 | Novotny | Apr. 28, 1931 |
| 1,889,751 | Kessler | Dec. 6, 1932 |
| 1,851,021 | Schuette | Mar. 29, 1932 |
| 2,101,944 | Honel | Dec. 14, 1937 |
| 2,150,698 | Nevin | Mar. 14, 1939 |
| 2,211,951 | Hershberger | Aug. 20, 1940 |

FOREIGN PATENTS

| Number | Country | Date |
|---|---|---|
| 325,861 | Great Britain | Mar. 3, 1930 |